June 19, 1934.  R. R. GRENINGER  1,963,660

AUTOMOBILE TRANSMISSION

Filed Dec. 28, 1931  4 Sheets-Sheet 1

INVENTOR
Robert R. Greninger
BY Harold E. Stonebraker
ATTORNEY

June 19, 1934.   R. R. GRENINGER   1,963,660
AUTOMOBILE TRANSMISSION
Filed Dec. 28, 1931   4 Sheets-Sheet 2
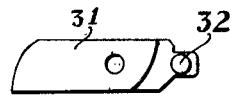
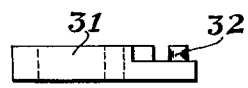
Fig. 11
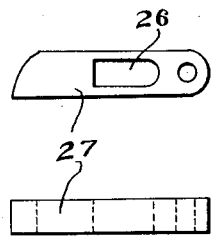
Fig. 10
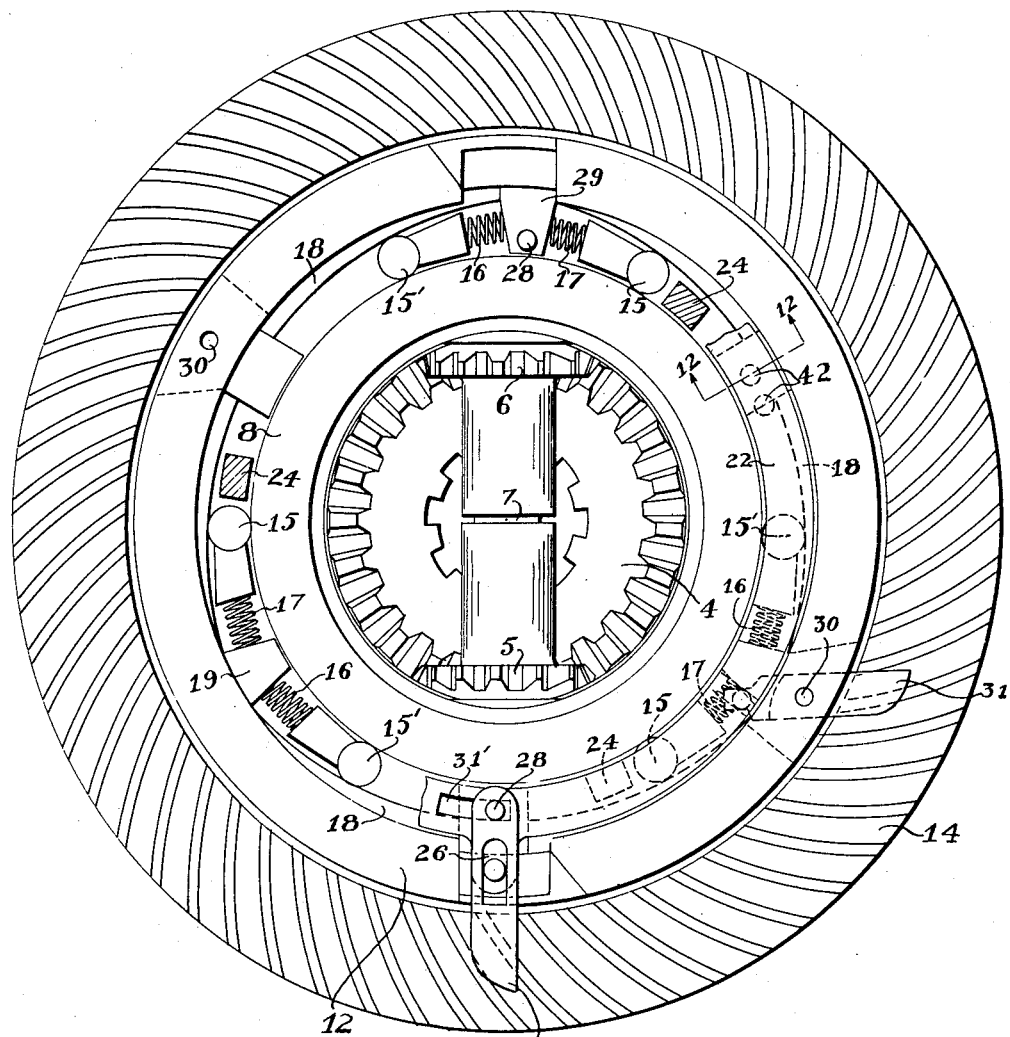
Fig. 3
INVENTOR
Robert R. Greninger
BY
Harold E. Stonebraker,
ATTORNEY June 19, 1934.   R. R. GRENINGER   1,963,660
AUTOMOBILE TRANSMISSION
Filed Dec. 28, 1931    4 Sheets-Sheet 3
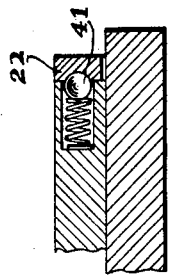
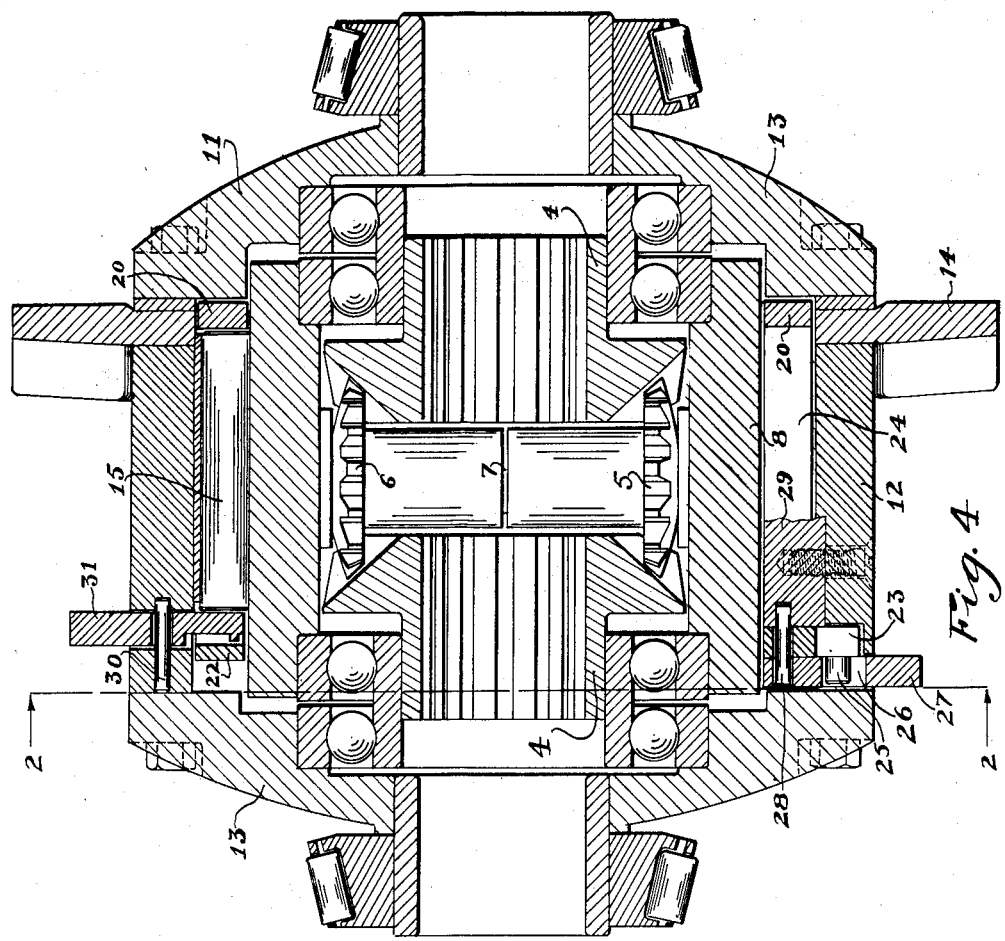
INVENTOR
Robert R. Greninger
BY Harold E. Stonebraker,
ATTORNEY June 19, 1934.　　　R. R. GRENINGER　　　1,963,660
AUTOMOBILE TRANSMISSION
Filed Dec. 28, 1931　　　4 Sheets-Sheet 4
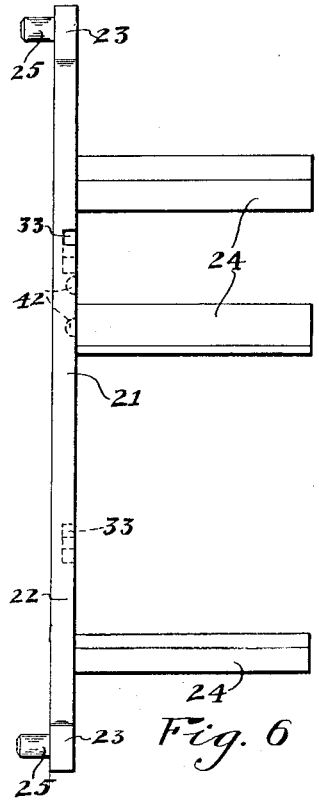
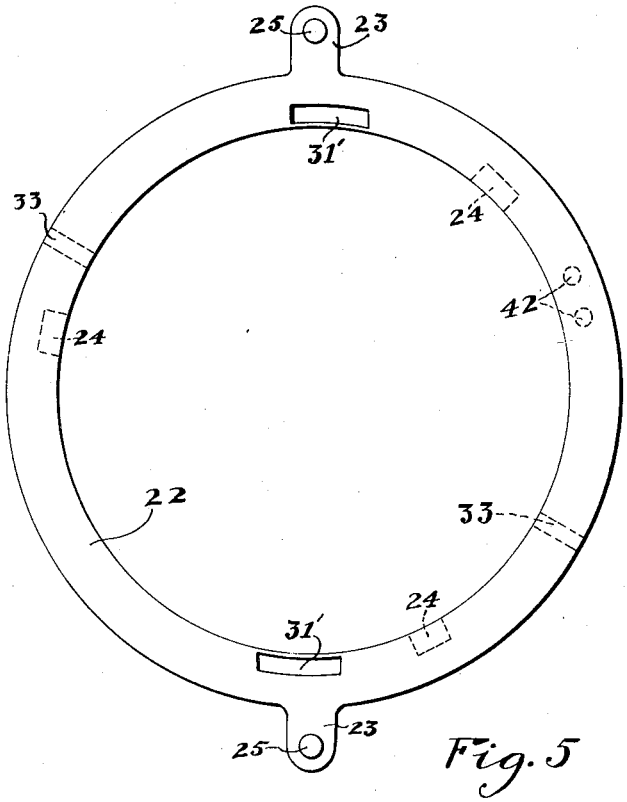
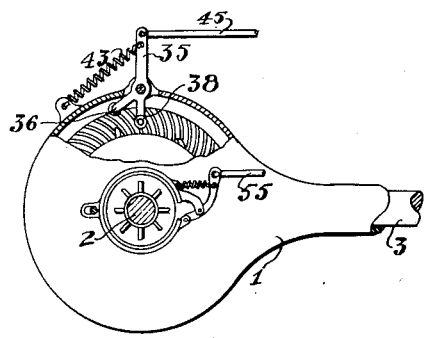
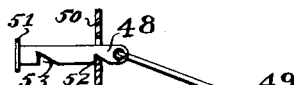
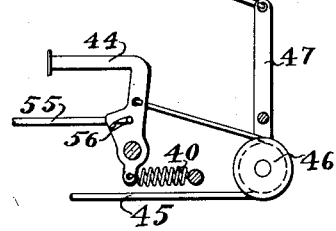
INVENTOR
Robert R. Greninger
BY Harold E. Stonebraker
ATTORNEY Patented June 19, 1934

1,963,660

UNITED STATES PATENT OFFICE 1,963,660

AUTOMOBILE TRANSMISSION

Robert R. Greninger, Rochester, N. Y., assignor to The Timken-Detroit Axle Company, Detroit, Mich., a corporation of Ohio Application December 28, 1931, Serial No. 583,529

9 Claims. (Cl. 192—13)

This invention relates to improvements in automobile transmission, and has for its principal object the provision of a transmission of this kind which is adapted to permit the vehicle to run forwardly independently of the motor speed, as in so-called free wheeling, and which is simple in construction, inexpensive to make, automatic in operation and which may be rendered inoperable at the will of the driver.

Another object of the invention is the provision of a transmission of this kind having a clutch to permit the automobile to overrun the speed of its motor but which may be operated automatically to connect the vehicle with the motor compression when the brake pedal is operated to set the brakes.

More specifically, the object of the invention is to provide a suitable clutch between the differential of an automobile and its drive shaft which permits the automobile to overrun its motor speed, said clutch being controlled either automatically by the brake pedal or manually by the operator.

To these and other ends, the invention consists in the construction and arrangement of parts that will appear from the following description when read in conjunction with the accompanying drawings, the novel features being pointed out in the claims at the end of the specification.

In the drawings:

Fig. 3 is a view similar to Fig. 2 but showing parts in another position;

Fig. 4 is a sectional view taken substantially on line 4—4 of Fig. 2;

Fig. 5 is a side elevation of a clutch operating ring;

Fig. 6 is a front elevation of the same;

Fig. 7 is a view similar to Fig. 1 but showing parts in another position;

Figs. 8 and 9 are detail views of a device for controlling the clutch operating ring;

Figs. 10 and 11 are detail views of a pair of dogs for operating the clutch operating ring, and Fig. 12 is a detail sectional view of a detent for retaining the ring in one or another position, the section being taken substantially on line 12—12 of Fig. 3.

Figure 1:
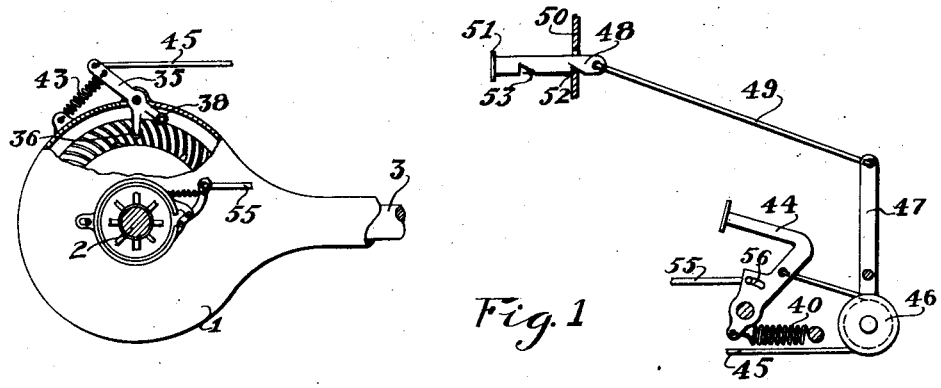
Fig. 1 is a fragmentary side elevation of an automobile differential and brake pedal illustrating one possible application of the invention.

Referring specifically to the drawings, in which like reference numerals refer to the same part in all figures, 1 is the differential housing of an automobile, 2 the rear axle and 3 the drive shaft. The axle is of the two-part kind, each part having a beveled gear 4 fixed on its inner end. Both beveled gears 4 mesh with a pair of gears 5 and 6 arranged between them and revolubly mounted on a shaft 7 arranged diametrically in a cylindrical member or housing 8 which incloses the gears 4, 5 and 6, and in the open ends of which the gears 4 have antifriction bearings.

The cylinder 8 is revolubly mounted in a housing generally referred to by the numeral 11 which is of cylindrical form and has antifriction bearings in the housing 1 in which it is revolubly mounted. The gears 4 also have antifriction bearings in the housing 11. The housing 11 comprises a cylindrical part 12 spaced from but concentric with the cylinder 8, the ends of which are closed by closures 13 secured thereto. Secured to or formed integral with the housing 11 is a curved tooth beveled gear 14 arranged at or adjacent one end of the cylindrical member 12 and having driving connection with a similarly toothed gear on the rear end of the drive shaft 3. Means are provided for connecting the housing 11 with the cylinder 8 so that they may turn as a unit in both directions but operable to permit the cylinder to turn therein in a forward direction. If they be so connected and power is applied to the gear 14 from the drive shaft, the housing 11 and cylinder 8 turn as a unit and the shaft 7 is revolved about a point which is substantially the middle of its longitudinal axis. If the vehicle is traveling in a substantially straight path at this time, the gears 4 rotate as a unit with the revolving gears 5 and 6 and there is no differentiation or relative movement between the gears 5 and 6 and the gears 4. If the vehicle be traveling in a curved path, the rear wheels describe curves of different radii and the one describing the curve of larger radius turns faster than the other, with the result that the gears 4 on the inner ends of the rear axle turn relatively to each other, causing the gears 5 and 6 to turn relatively thereto on the shaft 7.

Figure 2:
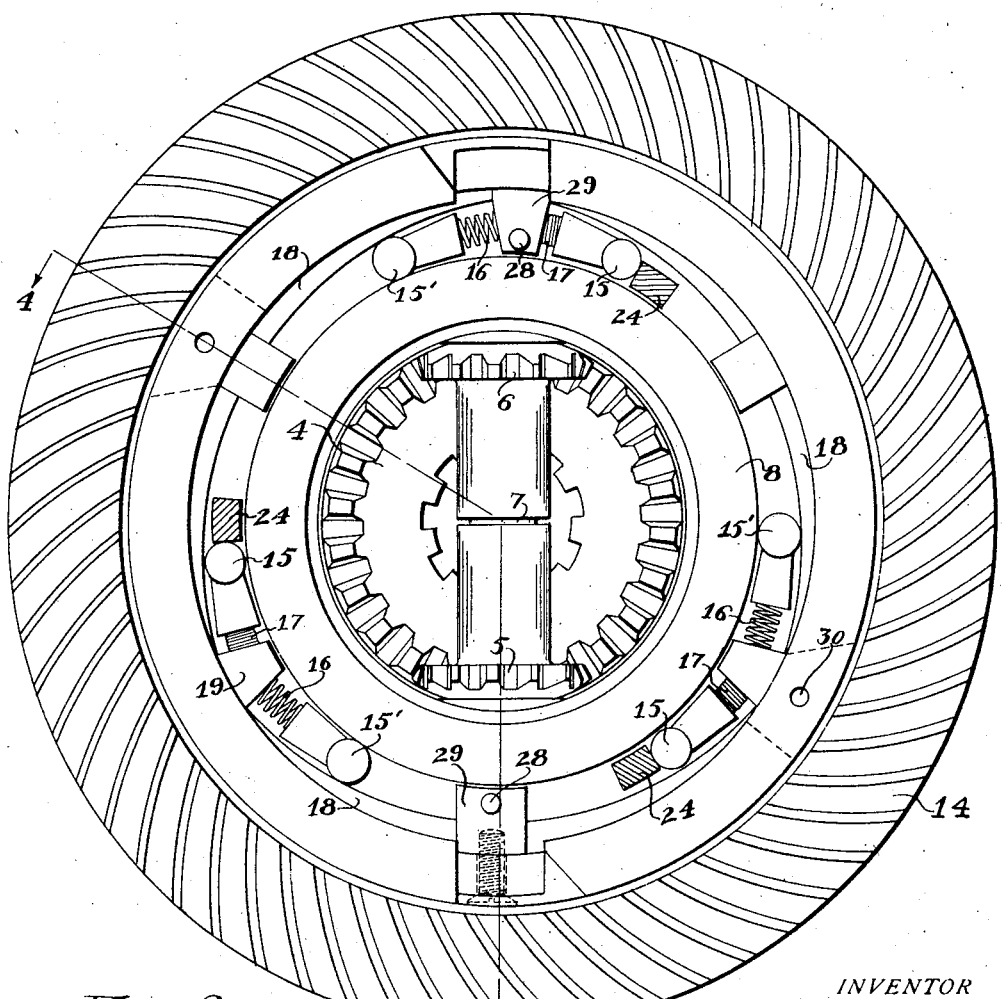
Fig. 2 is an enlarged sectional view of the differential shown in Fig. 1, the section being taken substantially on line 2—2 of Fig. 4.

The clutch illustrated in the present embodiment is of the friction type, although it will be readily understood that other forms or types of clutches may be used for the purpose without departing from the spirit of the invention. Said clutch comprises a plurality of rollers 15 and 15' arranged in pairs in the space between the cylinders 8 and 12, the members of each pair being urged by springs 16 and 17 into engagement with cams 18 on the inner surface of the cylinder 12, whereby they become wedged between the cylinders and secure them together to rotate as a unit. It will be noted that the rollers are so arranged that one of each pair operates to prevent relative rotation in one direction and the other prevents relative rotation in the other direction. If one of the rollers of each pair be retracted from the cam against the tension of its spring, as shown in Fig. 2, the cylinder 8 will be operatively connected with the cylinder 12 to be driven thereby but the cylinder 8 will be permitted to turn faster than the cylinder 12 in the same direction, which movement tends to move the other rollers 15′ against the tension of the springs 16 out of wedging engagement with the cylinders. This is the normal position of the parts when set for so-called free wheeling. The springs 16 and 17 are seated against spacing blocks 19 projecting inwardly from the inner wall of the cylinder 12 and adapted to bear against the outer wall of the cylinder 8.

Means are provided for moving the forward set of rollers 15 against the action of their springs 17 out of wedging engagement with the cylinders and retaining them in such disengaged position. To this end, a spider 21 comprising a ring 22 is revolubly mounted in the space between the cylinders 8 and 12 and adjacent one side thereof. The spider 21 is illustrated in detail in Figs. 5 and 6 and has a pair of outwardly projecting diametrically arranged ears 23 which engage in grooves or slots provided therefor in the cylinder 12. The ring 22 forms a thrust bearing for the rollers 15 at one end, and a ring 20 also arranged in the space between the cylinders serves as a thrust bearing for the other ends of the rollers. Secured to or formed integral with the ring 22 are a plurality of arms or fingers 24 corresponding in number to the number of pairs of rollers 15 and one arranged between each pair. The spider is movable circumferentially in the space between the cylinders into engagement with the forward set of rollers 15, as shown in Fig. 2, to disengage the rollers from the cylinders 8 and 12 to permit the cylinder 8 to turn with the rear axle at a greater speed in a forward direction than the driving cylinder 12. However, the other set of rollers 15′ connects the driven cylinder 8 with the driving cylinder 12 to be driven thereby whenever its forward speed tends to become less than the speed of the cylinder 12. Means are provided for turning the spider from the Fig. 2 to the Fig. 3 position or vice versa, and retaining it in either of said positions. Projecting laterally outward from each of the ears 23 are lugs or pivots 25 which engage elongated slots 26 provided therefor in dogs 27 arranged in the slots in the end of the cylinder 12 and projecting radially outwardly therefrom. The dogs 27, see Fig. 10, are pivotally mounted on posts or pivots 28 projecting from spacing blocks 29 projecting inwardly from the cylinder 12 into the space between the cylinders and integral with the cylinder 12 or secured thereto by means of screws, as shown. The posts or pivots 28 project through the slots 31′ in the ring 22 so that the ring has a limited movement relatively thereto. Means projectible into the path of the dog are provided for operating the dog to turn the ring from the position shown in Fig. 3 to that shown in Fig. 2 into engagement with the rollers 15 to move them from frictional engagement with both cylinders. In this position of the rollers 15, the cylinder 8 and the rear axle to which it is connected are free to turn forwardly at a greater speed than the cylinder 12 which is connected with the motor through the drive shaft. The speed of the cylinder 8, however, cannot fall below that of the cylinder 12, since the other set of rollers 15′ would then become operative to drive the cylinder 8 with the cylinder 12.

Another pair of dogs 31, see Fig. 11, is arranged in substantially oppositely arranged slots in the cylinder 12 in which they are pivotally mounted on the pivots 30. The dogs 31 project inwardly from the cylinder 12 into the space between it and the cylinder 8 adjacent the inner face of the ring 22 and at their inner ends have outwardly projecting lugs 32 which engage radially arranged slots 33 in the inner face of the ring 22. The outer ends of the dogs 31 project from the cylinder 12 where means may be projected into their path to operate them, and in the arrangement illustrated are operative to turn the ring 22 in a direction opposite to that in which it is turned by the dogs 27, since the dogs 27 and 31 engage the ring on relatively opposite sides of their pivots. They are also arranged on opposite sides of the ring so that each pair turns in a plane separated from the plane of the other.

A dog or operating member 35, shown in detail in Figs. 8 and 9, is pivotally mounted in the differential housing 1 substantially in the plane of the ring 22. The inner end of the operating member is provided with an inwardly projecting lug 36 arranged in the path of the dogs 31 and when engaged thereby turns the dogs on their pivots to turn the spider 21 in a direction to release the rollers 15 and establish driving connection between the cylinders 8 and 12 in both directions, as shown in Fig. 3. The inner end of the operating member is forked or bifurcated and has an arm 37 arranged forwardly from the lug 36 and having an outwardly projecting lug 38 on its end arranged in the path of the dogs 27 and operative to swing the dogs when engaged thereby to turn the spider 21 in a direction to move the rollers 15 out of locking engagement with the cylinders 8 and 12 to permit the cylinder 8 to turn at a greater speed forwardly than the cylinder 12, as shown in Fig. 2. A spring-pressed detent 41 is arranged to engage one or the other of the depressions 42 in the ring 22 for retaining the ring in one or the other of its operated positions. It will be noted that one pair or the other of the dogs 27 or 31 is always in an inoperative position when the other is in an operative position, and that movement of the pair of dogs from the operative position moves the other pair into operative position.

The operating member 35 has a limited pivotal movement in the housing 1, from the position shown in Fig. 1 to that shown in Fig. 7 of the drawings. A spring 43 resiliently connects the operating member with the housing 1 and tends to move the operating member to the position shown in Fig. 1, but when the parts are operative to permit free wheeling, it is moved to the position shown in Fig. 7 against the tension of its spring by the greater strength of the brake spring 40 operating on the brake pedal 44, to which the operating member is connected by means of the flexible cord or cable 45. When the brake pedal is operated against the tension of its spring to set the brakes, the cable is released which permits the spring 43 to operate and swing the operating member to the Fig. 1 position and the lug 36 into the path of the dogs 31. When one of the dogs 31 engages the lug 36 on the operating member, it is actuated to turn the spider to release the rollers 15 and permit their springs to reengage them with the cylinders to reestablish driving connection between the cylinders in both directions. This has the effect of adding the motor compression to the action of the brakes. When the brake pedal is released, the operating member is again returned to the Fig. 7 position in which the lug 38 operates on one or the other of the dogs 27 to disengage the rollers 15 and reestablish the condition of free wheeling. The lugs 36 and 38 may be provided with antifriction roller bearings as shown, if desired.

For the convenience of the operator or to meet local traffic regulations prevailing in some places, it is desirable to provide means under the control of the operator for establishing driving connection between the motor shaft and rear axle in both directions and simultaneously rendering the clutch inoperable by the brake pedal. For this purpose, the cord 45 is led over an idler or pulley 46 mounted on one arm of a lever 47 pivoted on the frame of the vehicle. The other arm of the lever 47 is connected with one end of a push rod 48 by means of a link 49. The rod 48 is slidably mounted in the instrument board 50 or other suitable place convenient to the operator, and at its other end is provided with a finger piece 51 whereby it may be manually operated. The push rod is also provided with detents or notches 52 and 53 for retaining it in either of the positions to which it may be operated. When the push rod 48 is in the position shown in the drawings, the idler 46 is in a position to tension the cord 45 and normally retain the operating member 35 in the position shown in Fig. 7 of the drawings, in which the clutch is released or the parts are in normal free wheeling position. When the push rod 48 is pushed in to the position in which its notch 53 engages the instrument board, the lever 47 swings on its pivot under the action of the spring 43 and the operating member 35 moves to the position shown in Fig. 1, in which the lug 36 is projected into the path of the locking dog to establish driving connection in both directions between the rear axle and the drive shaft.

It will be noted that when the operator 35 occupies the position shown in Fig 7, the parts are set for normal free wheeling and the automobile is free to coast or move forwardly at a rate of speed greater than the motor speed, and free from the retarding action of the motor compression. If the speed becomes greater than that desired by the operator, he presses the brake pedal 44 which, as above explained, connects the rear axle with the drive shaft and the motor compression at once operates to retard the speed. It is desirable that the motor compression become operative to retard the speed before the brakes are set for the same purpose or to stop the vehicle. To this end, the brake operating link 55 engages an elongated slot 56 in the brake pedal so that the latter has a limited movement to engage the clutch before the brakes are operated.

It will also be noted that the parts are conveniently arranged in the differential housing, the cylinders 8 and 12 being connected with the differential and drive shaft respectively and the cylinder 8 comprising a driven member adapted to be driven by the driving member 12.

Although only one embodiment of the invention is shown and described herein, it will be understood that this application is intended to cover such changes or modifications as come within the spirit of the invention or scope of the following claims.

I claim:

1. In an automobile transmission, the combination with a drive shaft and a rear axle driven thereby, of a differential in the rear axle, means operatively connecting the differential with the drive shaft to be driven thereby in a forward direction but permitting rotation of the differential in a forward direction independently of the drive shaft, a brake pedal, a brake operated by said pedal, and means operatively connected with the brake pedal for connecting the differential with the drive shaft to be driven by the latter in either direction, said means being operable in advance of the operation of the brake.

2. In an automobile transmission, the combination with a drive shaft and a rear axle driven thereby, of a differential in said rear axle, means operatively connecting the differential with the drive shaft to be driven thereby in either direction but operable to permit the differential to turn in a forward direction independently of the drive shaft, a brake pedal, flexible means operatively connecting the brake pedal with said means for operating the same when the brake pedal is operated, and manually controlled means for rendering said flexible means inoperable.

3. In an automobile transmission, the combination with a drive shaft and a rear axle driven thereby, of a differential in said axle, a housing for the differential, means separate from the differential operatively connecting it with the drive shaft to be driven thereby in either direction, said means being operable to release the differential from the drive shaft to permit the differential to turn in a forward direction independently thereof, a device on the differential housing for operating said means, said device being effective in two positions, one for operating said means to release the differential from the drive shaft and another for connecting the differential with the drive shaft, a brake pedal, and means controlled by the brake pedal for operating said device.

4. In an automobile transmission, the combination with a drive shaft and a rear axle driven thereby, of a differential in said axle, a housing for the differential, means operatively connecting the differential with the drive shaft to be driven thereby in either direction, said means being operable to release the differential from the drive shaft to permit the differential to turn in a forward direction independently thereof, a device on the differential housing for operating said means, said device being movable to two positions, one for operating said means to release the differential from the drive shaft and another for connecting the differential with the drive shaft, a brake pedal, means controlled by the brake pedal for operating said device, and manual means for rendering said device inoperable by the brake pedal.

5. In an automobile transmission, the combination with a drive shaft and a rear axle driven thereby, of a differential in the rear axle, means operatively connecting the differential with the drive shaft to be driven thereby in a forward direction but permitting rotation of the differential in a forward direction independently of the drive shaft, a brake, a foot pedal for operating the brake, and means controlled by said foot pedal for connecting the differential with the drive shaft to be driven thereby in either direction, the arrangement being such that the differential is connected with the drive shaft before the brake is operative.

6. In an automobile transmission, the combination with a drive shaft and a driven axle, of a driving member operatively connected with said drive shaft, a differential in said axle for permitting relative rotation of its parts and comprising a revoluble driven member, means operatively connecting said driven member with the driving member to be rotated thereby in one direction, separate means for connecting said driven member with the driving member to be driven thereby in the other direction, a brake pedal, and means operated by the brake pedal for rendering one of said connecting means effective or ineffective at will.

7. In an automobile transmission, the combination with a drive shaft and a driven axle, a cylindrical driving member operatively connected with the drive shaft, a cylindrical driven member in said driving member and concentric therewith, a differential gearing in said driven member and connected therewith to be driven thereby, means arranged between said cylindrical driving and driven members for connecting the driven member with the driving member to be driven thereby in one direction, separate means arranged between said members for connecting the driven member with the driving member to be driven thereby in the opposite direction, and means for rendering one of said connecting means ineffective to permit the driven member to turn freely and independent of the driving member in one direction.

8. In an automobile transmission, the combination with a drive shaft and a driven axle, a cylindrical driving member operatively connected with the drive shaft, a cylindrical driven member in said driving member and concentric therewith, a differential gearing in said driven member and connected therewith to be driven thereby, means arranged between said cylindrical driving and driven members for connecting the driven member with the driving member to be rotated thereby in both directions, and means for rendering said connecting means ineffective to rotate the driven member in one direction so that it can turn freely and independent of the driving member in the other direction.

9. In an automobile transmission, the combination with a drive shaft and a driven axle, a cylindrical driving member operatively connected with the drive shaft, a cylindrical driven member in said driving member and concentric therewith, a differential gearing in said driven member and connected therewith to be driven thereby, a plurality of rollers arranged between said cylindrical driving and driven members for connecting the driven member with the driving member to be driven thereby in one direction, a second plurality of rollers arranged between said cylindrical members for connecting the driven member with the driving member to be driven thereby in the other direction, and a spider for rendering one of said pluralities of rollers ineffective to permit the driven member to turn freely and independently of the driving member in one direction.

ROBERT R. GRENINGER.